United States Patent
Malamal Vadakital et al.

(10) Patent No.: US 9,820,015 B2
(45) Date of Patent: Nov. 14, 2017

(54) MEDIA ENCAPSULATING AND DECAPSULATING

(71) Applicant: Nokia Technologies Oy, Espoo (FI)

(72) Inventors: Vinod Kumar Malamal Vadakital, Tampere (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 14/583,332

(22) Filed: Dec. 26, 2014

(65) Prior Publication Data

US 2015/0193494 A1 Jul. 9, 2015

Related U.S. Application Data

(60) Provisional application No. 61/924,429, filed on Jan. 7, 2014.

(51) Int. Cl.
| | |
|---|---|
| *G06F 17/30* | (2006.01) |
| *H04N 21/85* | (2011.01) |
| *H04N 21/234* | (2011.01) |
| *H04N 21/44* | (2011.01) |

(52) U.S. Cl.
CPC ........ *H04N 21/85* (2013.01); *H04N 21/234* (2013.01); *H04N 21/44* (2013.01)

(58) Field of Classification Search
CPC combination set(s) only.
See application file for complete search history.

(56) References Cited

U.S. PATENT DOCUMENTS

| 8,825,900 B1 * | 9/2014 | Gross, IV | H04L 47/31 709/238 |
|---|---|---|---|
| 2007/0266028 A1 | 11/2007 | Muller et al. | |
| 2008/0275905 A1 * | 11/2008 | Hannuksela | G06F 17/30017 |

(Continued)

FOREIGN PATENT DOCUMENTS

| WO | 2011/038013 A2 | 3/2011 |
|---|---|---|
| WO | WO-2012/032502 | 3/2012 |

OTHER PUBLICATIONS

International Search Report and Written Opinion received for corresponding Patent Cooperation Treaty Application No. PCT/FI2014/051052, dated Apr. 13, 2015, 26 pages.

(Continued)

*Primary Examiner* — Shyue Jiunn Hwa
(74) *Attorney, Agent, or Firm* — Alston & Bird LLP

(57) ABSTRACT

There are disclosed various methods, apparatuses and computer program products for media encapsulating and decapsulating. A container file according to a first format is obtained or generated including or referring to at least two media data units and to an obtained or generated metadata item according to a second format, the metadata item being valid for one or more media data units; and scope information is included in the container file indicating said one or more of said at least two media data units. There is also disclosed a method comprising receiving the container file; receiving the metadata item; and parsing from the container file the scope information; selecting one or more of said at least two media data units on the basis of the scope information; and determining the validity of the metadata item for said one or more of said at least two media data units.

12 Claims, 12 Drawing Sheets

(56) References Cited

U.S. PATENT DOCUMENTS

| | | | | |
|---|---|---|---|---|
| 2010/0145917 A1* | 6/2010 | Bone | ............... | G06F 17/30082 707/694 |
| 2010/0274816 A1* | 10/2010 | Guzik | ............... | G11B 27/034 707/802 |
| 2011/0071841 A1* | 3/2011 | Fomenko | ............ | G06F 17/30206 705/1.1 |

OTHER PUBLICATIONS

"3rd Generation Partnership Project; Technical Specification Group Services and System Aspects; Transparent end-to-end packet switched streaming service (PSS); 3GPP file format (3GP) (Release 12)", 3GPP TS 26.244, V12.2.0, Dec. 2013, pp. 1-61.

"Graphic Technology Extensible Metadata Platform (XMP) Specification", ISO 16684-1, Feb. 2, 2012, pp. 1-7.

"Exchangeable Image File Format for Digital Still Cameras", Standard of the Camera & Imaging Products Association, CIPA DC-008, Exif Version 2.3, 2012, pp. 1-190.

"Information Technology—JPEG 2000 Image Coding System: Core Coding System", ITU-T Telecommunication Standardization Sector of ITU Series T: Terminals for Telematic Services, T.800, Aug. 2002, pp. 1-212.

"3rd Generation Partnership Project; Technical Specification Group Services and System Aspects; Transparent End-To-End Packet Switched Streaming Service (PSS); 3GPP File Format (3GP) (Release12)", 3GPP TS 26.244, V12.0.0, Mar. 2013, pp. 1-61.

Myers et al., "The Content-MD5 Header Field", Network Working Group, RFC1864, Oct. 1995, pp. 1-4.

McMillan, "An Image-Based Approach to Three-Dimensional Computer Graphics", Doctoral Dissertation, 1997, 206 pages.

Mark, "Post-Rendering 3D Image Warping: Visibility, Reconstruction, and Performance for Depth-Image Warping", Technical Report, Apr. 21, 1999, 227 pages.

Graphic Technology Extensible Metadata Platform (XMP) Specification: Part 1, Data Model, Serialization, and Core Properties, ISO 16684-1:2011(E), Apr. 2012.

"Information Technology—Coding of Audio-Visual Objects—Part 12: ISO base media file format." ISO/IEC 14496-12, Corrected Version, Oct. 1, 2005, 94 pages.

Extended European Search Report for European Patent Application No. 14877713.9 dated Jul. 13, 2017, 9 pages.

* cited by examiner

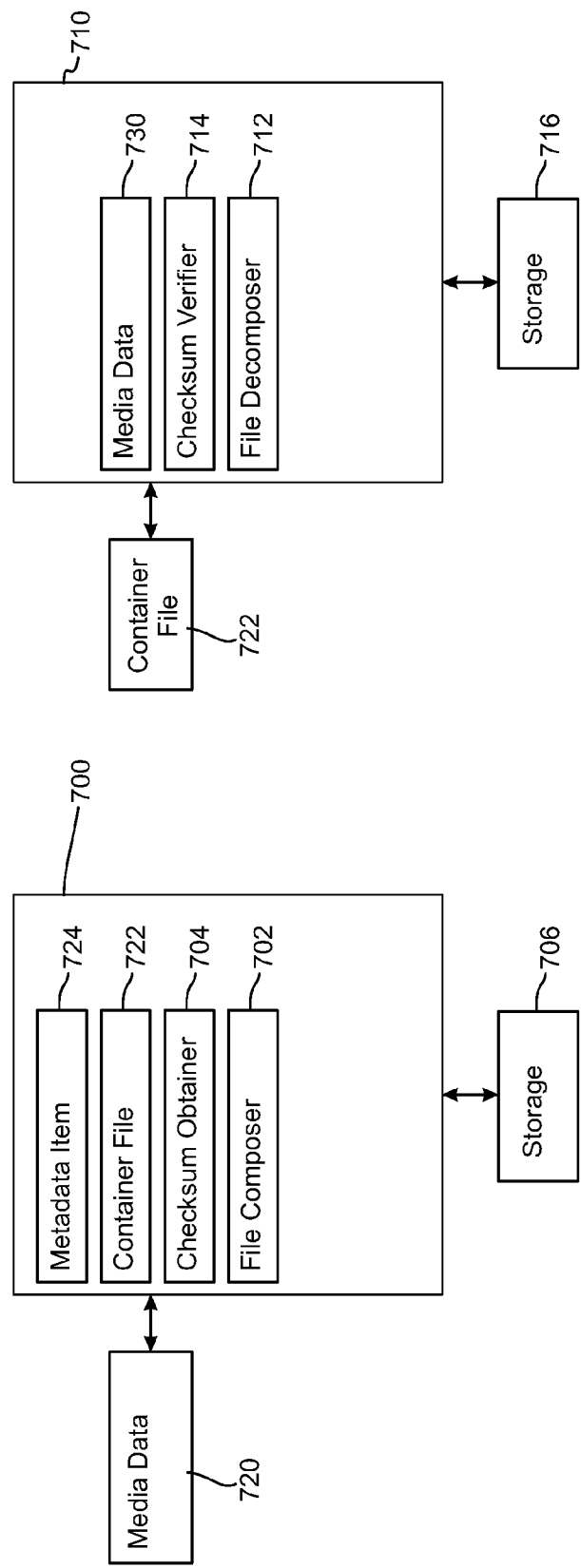

MEDIA ENCAPSULATING AND DECAPSULATING

TECHNOLOGICAL FIELD

The present invention relates generally to the use of multimedia file formats. More particularly, the present invention relates to a method for encapsulating media data signal into a file and a method for decapsulating media data from a file. The present invention also relates to apparatuses and computer program products for encapsulating media data into a file and apparatuses and computer program products for decapsulating media data from a file.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A multimedia container file format is an element in the chain of multimedia content production, manipulation, transmission and consumption. In this context, the coding format (i.e., the elementary stream format) relates to the action of a specific coding algorithm that codes the content information into a bitstream. The container file format comprises mechanisms for organizing the generated bitstream in such a way that it can be accessed for local decoding and playback, transferring as a file, or streaming, all utilizing a variety of storage and transport architectures. The container file format can also facilitate the interchanging and editing of the media, as well as the recording of received real-time streams to a file. As such, there may be substantial differences between the coding format and the container file format.

BRIEF SUMMARY

Various embodiments provide systems and methods for encapsulating media data into a file, and for decapsulating a media data from a file. In some embodiments a container file according to a first format is obtained or generated, the container file including or referring to at least two media data units; a metadata item according to a second format different from the first format is obtained or generated, the metadata item being valid for one or more of said at least two media data units, the container file including or referring to the metadata item; and scope information is included in the container file indicating said one or more of said at least two media data units. In some embodiments a checksum or other verifier is obtained or generated and attached with the container file.

In some embodiments, the checksum is derived from information on said one or more of said at least two media data units.

Various aspects of examples of the invention are provided in the detailed description.

According to a first aspect there is provided a method comprising:

receiving a container file according to a first format, the container file including or referring to at least two media data units;

receiving a metadata item according to a second format different from the first format, the metadata item being valid for one or more of said at least two media data units, the container file including or referring to the metadata item; and parsing from the container file scope information indicating said one or more of said at least two media data units;

selecting one or more of said at least two media data units on the basis of the scope information; and determining the validity of the metadata item for said one or more of said at least two media data units.

According to a second aspect there is provided an apparatus comprising at least one processor and at least one memory, said at least one memory stored with code thereon, which when executed by said at least one processor, causes an apparatus to perform at least the following:

receive a container file according to a first format, the container file including or referring to at least two media data units;

receive a metadata item according to a second format different from the first format, the metadata item being valid for one or more of said at least two media data units, the container file including or referring to the metadata item; and parse from the container file scope information indicating said one or more of said at least two media data units;

select one or more of said at least two media data units on the basis of the scope information; and determine the validity of the metadata item for said one or more of said at least two media data units.

According to a third aspect there is provided a computer program product embodied on a non-transitory computer readable medium, comprising computer program code configured to, when executed on at least one processor, cause an apparatus or a system to:

receive a container file according to a first format, the container file including or referring to at least two media data units;

receive a metadata item according to a second format different from the first format, the metadata item being valid for one or more of said at least two media data units, the container file including or referring to the metadata item;

parse from the container file scope information indicating said one or more of said at least two media data units;

select one or more of said at least two media data units on the basis of the scope information; and determine the validity of the metadata item for said one or more of said at least two media data units.

According to a fourth aspect there is provided a method comprising:

obtaining or generating a container file according to a first format, the container file including or referring to at least two media data units;

obtaining or generating a metadata item according to a second format different from the first format, the metadata item being valid for one or more of said at least two media data units, the container file including or referring to the metadata item; and including in the container file scope information indicating said one or more of said at least two media data units.

According to a fifth aspect there is provided an apparatus comprising at least one processor and at least one memory, said at least one memory stored with code thereon, which when executed by said at least one processor, causes an apparatus to perform at least the following:

obtain or generate a container file according to a first format, the container file including or referring to at least two media data units;

obtain or generate a metadata item according to a second format different from the first format, the metadata item being valid for one or more of said at least two media data units, the container file including or referring to the metadata item; and include in the container file scope information indicating said one or more of said at least two media data units.

According to a sixth aspect there is provided a computer program product embodied on a non-transitory computer readable medium, comprising computer program code configured to, when executed on at least one processor, cause an apparatus or a system to:

obtain or generate a container file according to a first format, the container file including or referring to at least two media data units;

obtain or generate a metadata item according to a second format different from the first format, the metadata item being valid for one or more of said at least two media data units, the container file including or referring to the metadata item; and include in the container file scope information indicating said one or more of said at least two media data units.

According to a seventh aspect there is provided an apparatus configured to perform the method of the first aspect.

According to an eighth aspect there is provided an apparatus configured to perform the method of the fourth aspect.

BRIEF DESCRIPTION OF THE DRAWING(S)

Having thus described some embodiments of the invention in general terms, reference will now be made to the accompanying drawings, which are not necessarily drawn to scale, and wherein:

FIG. 7a depicts an example of an apparatus suitable for composing media files;

FIG. 7b depicts an example of an apparatus suitable for decomposing container files;

Figure 10:
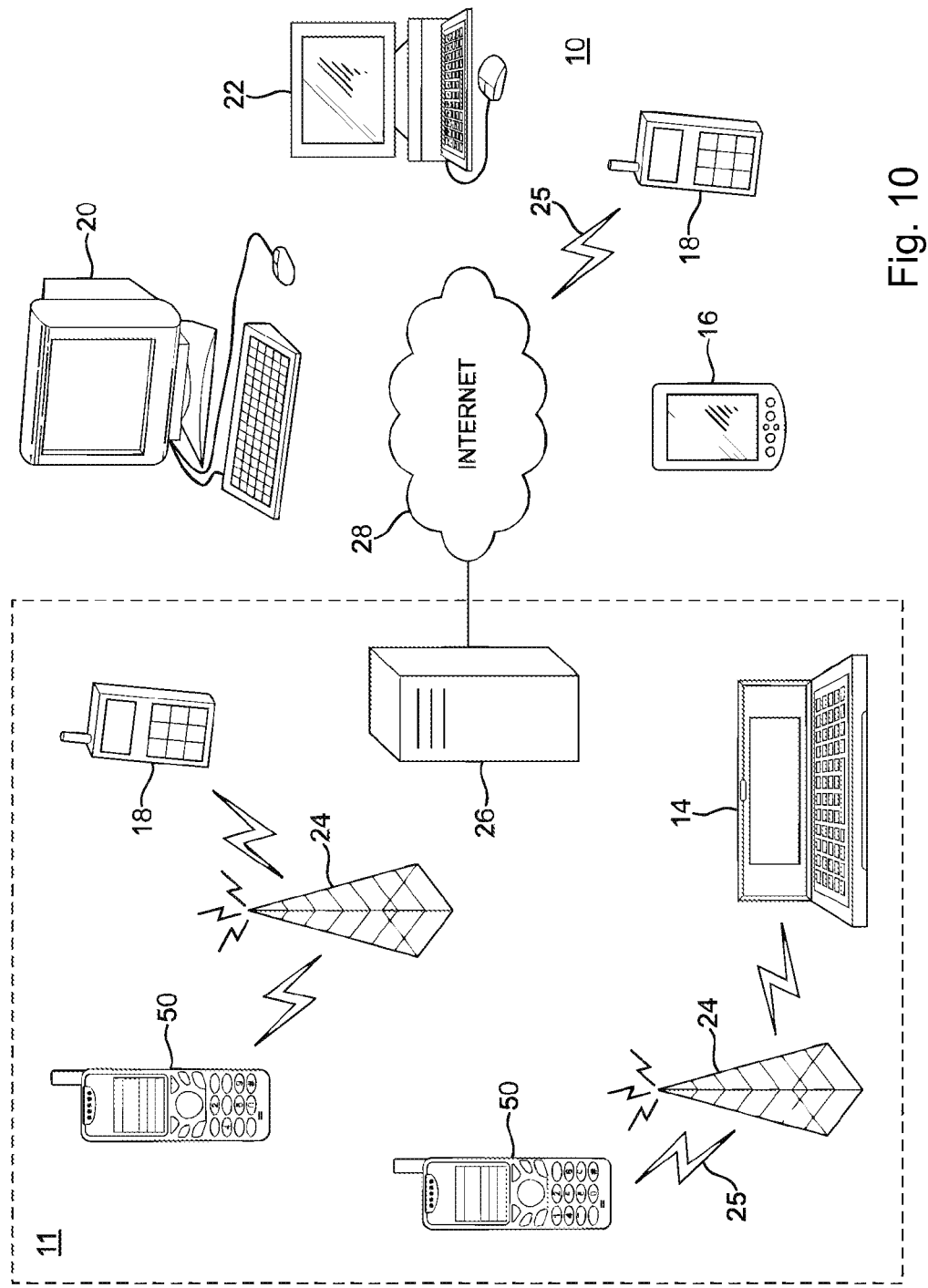
Figure 11:
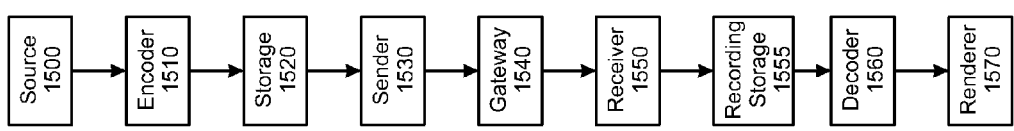

FIG. 10 further shows schematically electronic devices employing embodiments of the invention connected using wireless and/or wired network connections; and FIG. 11 is a graphical representation of an example of a generic multimedia communication system within which various embodiments may be implemented.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some further definitions used in this specification may be described as follows. A coding format may relate to an action of a specific coding algorithm that codes content information into a bitstream. A container file format may comprise means of organizing the generated bitstream in such a way that it may be accessed for decoding and playback, transferred as a file, or streamed, all possibly utilizing a variety of storage and transport architectures. Furthermore, a container file format can facilitate interchange and editing of the media as well as recording of received real-time streams to a file. Metadata may be understood to comprise structural or descriptive information about media data.

When media data is stored using a container file format, at least part of the metadata may be represented by the file format structures of the container file format. However, a part of the metadata may be represented using a metadata format that is distinct from the container file format. For example, the metadata format and the container file format may be specified in different specifications and/or they may use different basic units or elements. For example, the container file format may be based on elements comprising key-length-value triplets, where the key indicates the type of information, the length indicates the size of the information, and the value comprises the information itself. The box structure used in the ISO Base Media File Format may be regarded as an example of a container file element comprising of a key-length-value triplet. Continuing the same example, a metadata format may be based on an XML (Extensible Markup Language) schema.

Many different types of metadata exist for digital photographs, including but not limited to the following: Extensible metadata platform (XMP) which is specified in ISO International Standard 16684-1; Exchangeable image file format (EXIF) in which the metadata is primarily stored in the APP1 section of EXIF file format; and JPEG-2000 metadata, specified for example in ITU-T Recommendations T.800 and T.801.

Metadata for digital photographs may include for example camera parameters, location of capture, type, and operations on the captured images/video. Such metadata may form a part of a video/image processing pipeline.

Some media file format standards include ISO base media file format (ISO/IEC 14496-12, which may be abbreviated ISOBMFF), MPEG-4 file format (ISO/IEC 14496-14, also known as the MP4 format), advanced video coding (AVC) file format (ISO/IEC 14496-15) and 3GPP file format (3GPP TS 26.244, also known as the 3GP format). The scalable video coding (SVC) and the multiview video coding (MVC) file formats are specified as amendments to the AVC file format. The ISO file format is the base for derivation of all the above mentioned file formats, excluding the ISO file format itself. These file formats, including the ISO file format itself, may generally be called the ISO family of file formats.

One building block in the ISO base media file format is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track box. A track may be, for example, one of the following types: media, hint, timed metadata. A media track refers to samples formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

Figure 6:
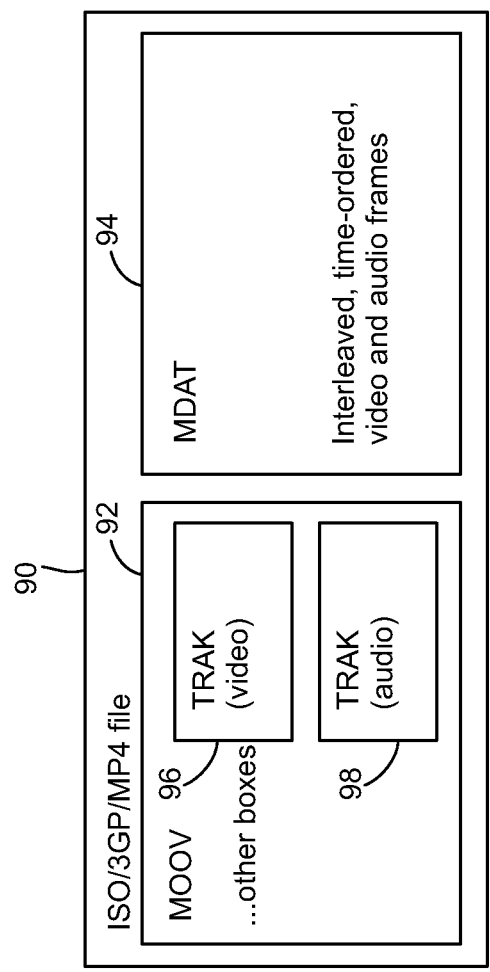
FIG. 6 illustrates a simplified file structure according to the ISO base media file format.

FIG. 6 illustrates an example of a simplified file structure according to the ISO base media file format. As shown in FIG. 6, the file 90 may include the moov box 92 and the mdat box 94 and the moov box 92 may include tracks (trak 96 and trak 98) that correspond to video and audio, respectively.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used when recording content to ISO files in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping.

The sample group boxes (SampleGroupDescription Box and SampleToGroup Box) reside within the sample table (stbl) box, which is enclosed in the media information (minf), media (mdia), and track (trak) boxes (in that order) within a movie (moov) box. The SampleToGroup box is allowed to reside in a movie fragment. Hence, sample grouping can be done fragment by fragment.

Sample groups are defined in ISOBMFF using two correlated boxes. These boxes are the SampleToGroupBox, which may be indicated e.g. by a four character code 'sbgp' (fourCC: 'sbgp') and the SampleGroupDescriptionBox (fourCC: 'sgpd'). Both these boxes are located in the SampleTableBox (fourCC: 'stbl'). The SampleToGroupBox assigns a subset of samples in the track to one or more sample groups. The definition and description of each sample group defined on the track may be handled by the SampleGroupDescriptionBox.

Linking of samples in the track to one or more metadata schemas in the track may be handled by sample grouping. The definition of a SampleToGroupBox is defined in ISOBMFF in the following way:

```
aligned(8) class SampleToGroupBox
extends FullBox('sbgp', version, 0)
{
    unsigned int(32) grouping_type;
    if (version == 1) {
        unsigned int(32) grouping_type_parameter;
    }
    unsigned int(32) entry_count;
    for (i=1; i <= entry_count; i++) {
        unsigned int(32) sample_count;
        unsigned int(32) group_description_index;
    }
}
```

While the SampleToGroupBox may assign samples to sample groups, the description of the characteristics of the sample groups itself may be provided by the SampleGroupDescriptionBox. The SampleGroupDescriptionBox may be defined as follows.

```
aligned(8) class SampleGroupDescriptionBox (unsigned int(32)
handler_type)
extends FullBox('sgpd', version, 0){
unsigned int(32) grouping_type;
if (version==1) {
    unsigned int(32) default_length;
}
unsigned int(32) entry_count;
int i;
for (i = 1 ; i <= entry_count ; i++){
if (version==1) {
    if (default_length==0) {
        unsigned int(32) description_length;
    }
}
switch (handler_type){
    case 'pict': // for picture tracks
        VisualSampleGroupEntry (grouping_type);
        break;
    case 'vide': // for video tracks
        VisualSampleGroupEntry (grouping_type);
        break;
    case 'soun': // for audio tracks
        AudioSampleGroupEntry(grouping_type);
        break;
    case 'hint': // for hint tracks
        HintSampleGroupEntry(grouping_type);
        break;
}
}
```

The input to the SampleGroupDescriptionBox is a handler type which may be the track handler_type. For a sequence of untimed images or image bursts the handler type may be 'pict' and for timed video and images the handler types may be 'vide'. In both these cases the VisualSampleGroupEntry structure may be used. The VisualSampleGroupEntry is an extension of the abstract structure SampleGroupEntry. It is this structure where the characteristics of the sample group description entry may be placed.

Sample auxiliary information may be stored anywhere in the same file as the sample data itself. For self-contained media files, where the media data resides in the same file as the file format metadata (such as the moov box), sample auxiliary information may reside in a MediaData box. Sample auxiliary information may be stored (a) in multiple chunks, with the number of samples per chunk, as well as the number of chunks, matching the chunking of the primary sample data, or (b) in a single chunk for all the samples in a movie sample table (or a movie fragment). The Sample Auxiliary Information for all samples contained within a single chunk (or track run) may be stored contiguously (similarly to sample data). The Sample Auxiliary Information Sizes box may optionally include the type and a type parameter of the auxiliary information and may specify the size of the auxiliary information for each sample. The Sample Auxiliary Information Offsets box may specify the position information for the sample auxiliary information in a way similar to the chunk offsets for sample data.

Sample groups and timed metadata are less tightly coupled to the media data and may be 'descriptive', whereas sample auxiliary information might be required for decoding. Sample auxiliary information may be intended for use where the information is directly related to the sample on a one-to-one basis, and may be required for the media sample processing and presentation.

Figure 2:
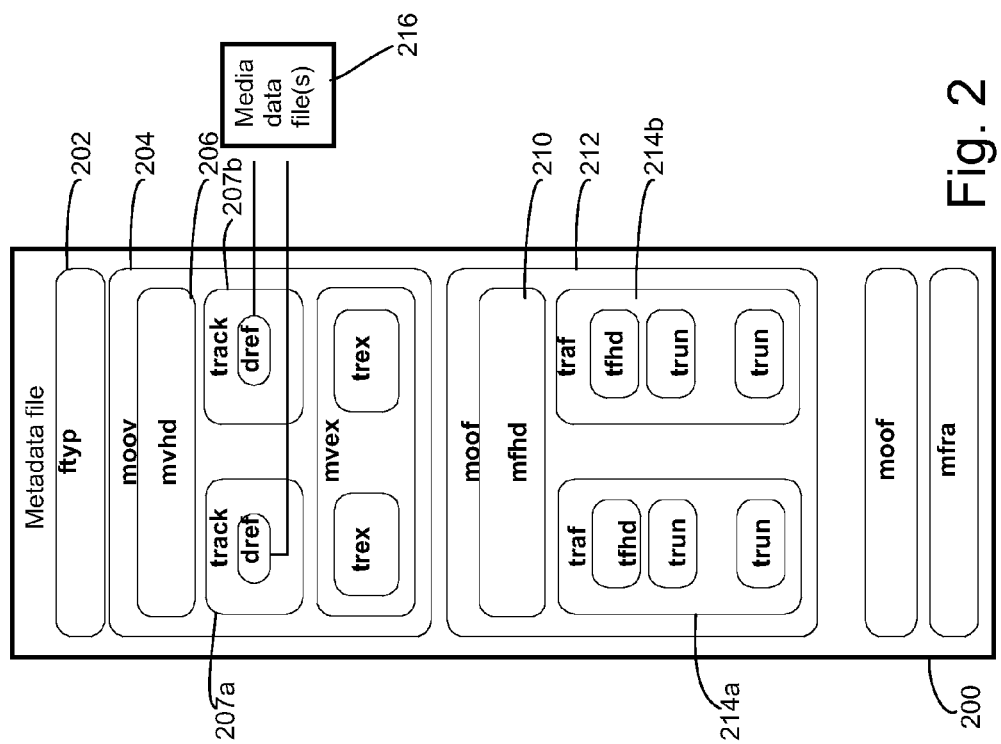
FIG. 2 illustrates some structures of an International Organization for Standardization (ISO) base media file format.

FIG. 2 illustrates some structures of an International Organization for Standardization (ISO) base media file format (ISOBMFF). In the example of FIG. 2, the metadata may be stored separately from the media data, which may be stored in one or more external files. The metadata may be partitioned into fragments covering a certain playback duration. If the file contains tracks that are alternatives to each other, such as the same content coded with different bitrate, the example of FIG. 2 illustrates the case of a single metadata file for all versions. However, if the file contains tracks that are not alternatives to each other, then the example structure provides for one metadata file for each version. According to FIG. 2, the media content may be stored as a metadata file and one or more media data file(s). The metadata file may comprise an ftyp box. The ftyp box may be the first box in the metadata file and may comprise information about the brand and version number of the media content. The moov box may comprise information about the structure of the media data file. The moov box may comprise one or more track boxes, which describe the different media tracks that are described by the metadata file. The track boxes may further comprise information about the codecs and formats of the media described by the track. The track boxes may not comprise a description of the samples themselves, however, so as to keep the box relatively small in size. The track boxes may also comprise dref boxes, which may include a reference to the media data file that contains samples for the track. The metadata file may further comprise an mvex box, which may hold default values for the subsequent movie fragment boxes and may indicate that movie fragments are used. The moof box may comprise metadata that describes the samples of a movie fragment. The moof box may be structured as a plurality of traf boxes, which describe specific tracks of the movie. The traf boxes may comprise at least one turn box, which describes the media data fragments in track runs. Offsets may be provided to point to the specific media data fragment in the referenced media data file.

The transport file formats or segment formats that may be employed can be coarsely categorized into different classes. In one example class, transmitted files may be compliant with an existing file format that can be used for live file playback. For example, transmitted files may be compliant with the ISO base media file format or the progressive download profile of the Third Generation Partnership Project (3GPP) file format. In another example class, transmitted files may be similar to files formatted according to an existing file format used for live file playback. For example, transmitted files may be fragments of a server file, which might not be self-containing for playback individually. In another approach, files to be transmitted may be compliant with an existing file format that can be used for live file playback, but the files may be transmitted only partially and hence playback of such files may require awareness and capability of managing partial files.

In addition to timed metadata tracks, ISO files may contain any non-timed metadata objects in a meta box (fourCC: 'meta'). The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of metadata items that can be referred and each one of them can be associated with a file name and are uniquely identified with the file by item identifier (item_id) which is an integer value. The metadata items may be for example stored in the meta box or in an mdat box or reside in a separate file. If the metadata is located external to the file then its location may be declared by the DataInformationBox (fourCC: 'dinf'). In the specific case that the metadata is formatted using XML syntax and is required to be stored directly in the MetaBox, the metadata may be encapsulated into either the XMLBox (fourCC: 'xml') or the BinaryXMLBox (fourcc: 'bxml').

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

The Meta Box mechanism of the ISO base media file format (ISOBMFF) allows storage of and access to metadata specified in other specifications. Some metadata formats may include fragments that only apply to certain media units, such as pictures, within a sequence of media units, such as a video or image burst. However, currently no linking of the coded media data and metadata items is supported by ISOBMFF. Entities that operate on ISOBMFF might not understand both the coded representation and its metadata simultaneously. It may be possible that the container file operations are performed by one entity, while the metadata creation/parsing are performed by another entity, if any. Therefore, situations may arise when an entity manipulates (insert, delete, or modify) the media data but fails to synchronize the respective changes also in the metadata; this is because it does not understand it. When such manipulations are done frequently, the metadata may become useless for its intended purpose.

In some embodiments, a file creator or editor may create a checksum to the file that is associated to a metadata item and is derived from media units that are required to be present in the file so that the metadata item remains valid. For example, if a metadata item comprises an extensible metadata platform (XMP) description that contains fragments concerning particular pictures within a sequence of pictures, a checksum may be generated from those particular pictures. The checksum may also be accompanied with information of the media units from which it is derived. This information may be referred to as the scope information. In other words, scope information may define the subset of media units which the checksum deals with or to which it is relevant. The scope information may for example refer to a list of media units, such as a sample grouping of ISOBMFF, and/or the type of media units for which the checksum has been generated.

A metadata item may be considered valid when both the metadata item and the media data units the metadata item applies to are unchanged or unaltered compared to the situation when the metadata item and the media data units were created or stored in the container file and/or when the scope information resolves to the same set of media data units as when the metadata item and the media data units were created or stored in the container file. A metadata item may be considered invalid when the metadata item and/or the media data units the metadata item applies to are changed compared to the situation when the metadata item and the media data units were created or stored in the container file. Additionally or alternatively, a metadata item may be considered invalid when media data units are added or deleted so that the metadata item is concluded to apply to different media data units than those which it referred to when the metadata item and the media data units were created or stored in the container file.

In the following, some example embodiments are described in more detail with reference to the apparatuses of FIG. 7a. According to an example embodiment, the apparatus 700 may receive or otherwise obtain media data 720 for generating one or more container files from the media data. The media data may comprise one or more media data units. Each media data unit may relate to video, audio, image or other media data (e.g. text). The apparatus 700 may have a file composer 702 or other means for obtaining and/or generating a container file 722 according to a first format. The file composer 702 may include at least two media data units in the container file, or the file composer 702 may include a reference to the at least two media data units in the container file. The reference may for example comprise a URN (Uniform Resource Name) or URL (Uniform Resource Locator) that identifies a file or a resource containing the at least two media data units. Said file or resource may reside in the same or different storage system, mass memory and/or apparatus than the container file.

The file composer 702 of the apparatus 700 or some other means may further obtain or generate a metadata item 724 according to a second format which is different from the first format. The obtained or generated metadata item 724 may be valid for one or more of said at least two media data units. The file composer or the other means may further include the metadata item in the container file, or include a reference to the metadata item in the container file (while the metadata item may be stored in a file different from the container file). If the metadata item is stored in a file different from the container file, the file containing the metadata item may reside in the same or different storage system, mass memory and/or apparatus than the container file. The file containing the metadata item may be referred to using a URN (Uniform Resource Name) or URL (Uniform Resource Locator) for example.

The apparatus 700 may also comprise a checksum obtainer 704 or other means suitable for obtaining a checksum on the basis of at least a part of the information which relates to the container file 722. For example, the checksum obtainer 704 may calculate a checksum by using information of said two or more data units or parts of said two or more data units. In addition to or instead of said two or more data units, the checksum obtainer 704 may use other information relating to the container file in the calculation of the checksum. The checksum obtainer 704 also generates scope information which indicates said one or more of said at least two media data units i.e. the information used in the checksum calculation process. The scope information may define the subset of media units which the checksum deals with or to which it is relevant. The scope information may for example refer to a list of media units, where one or more these references may be made through an identifier, such as an index, of said one or more of said at least two media data units, for example included in a particular sample grouping of ISOBMFF.

The calculated or otherwise obtained checksum and the scope information may be included, for example, in the container file 722. Alternatively or additionally, the calculated or otherwise obtained checksum and the scope information may be included, for example, in a file or resource containing the metadata item. Alternatively or additionally, the calculated or otherwise obtained checksum and the scope information may be included, for example, in a file or resource referred to by the container file, for example using a URN or a URL.

The container file 722 and other information may be stored into the memory 706 and/or to some other storage location, and/or the container file 722 may be transmitted to another device e.g. for storing, decomposing and playback.

In some embodiments the apparatus 700 may include in the container file scope information which additionally indicates types of information on said one or more of said at least two media data units used for deriving the checksum. In some embodiments the types of information may comprise the size of each of said one or more of said at least two media data units and/or said one or more of said at least two media data units.

In some embodiments, a file reader 710 (FIG. 7b) or player may perform the following operations to decompose the media data from the container file 722 and to check the validity of the media data. The file reader 710 may comprise a file decomposer 712 or other means for parsing the scope information from the container file 722. The file reader 710 or player may further comprise a checksum verifier 714 or other means for deriving a checksum from the media units in the file as indicated in the scope information. The checksum verifier 714 may compare 714 the derived checksum to the checksum stored in the container file 722. If the two checksums are equal, the metadata item may be determined to be valid. Otherwise, the metadata item may be determined to be not valid. In some embodiments, instead of or in addition to parsing the scope information and/or the stored checksum from the container file, the scope information and/or the stored checksum may be parsed from the file containing the metadata item and/or from a file or resource referred to by the container file, for example using a URN or a URL.

In some embodiments the decomposing of the media data may include e.g. the following. The file reader 710 receives the container file 722 according to a first format. The file reader 710 may also receive a metadata item according to a second format different from the first format. The container file 722 may include or refer to at least two media data units. Furthermore, the container file 722 may include or refer to the metadata item. The file decomposer 712 may parse scope information from the container file and select one or more of said at least two media data units on the basis of the scope information. The scope information may define the subset of media units which the checksum stored in the file deals with or to which it is relevant, when the checksum stored in the file was created. The scope information may for example refer to a list of media units, where one or more these references may be made through an identifier, such as an index, of said one or more of said at least two media data units, for example included in a particular sample grouping of ISOBMFF.

The checksum verifier 714 may determine that the metadata item is valid for said one or more of said at least two media data units e.g. by parsing a first checksum from the container file and deriving a second checksum from information on said selected one or more of said at least two media data units. Then, the checksum verifier 714 may compare the first checksum and the second checksum and determine the validity of the metadata item e.g. as follows: if the first checksum is equal to the second checksum, the checksum verifier 714 may determine that the metadata item is valid for said one or more of said at least two media data units, or if the first checksum is not equal to the second checksum, the checksum verifier 714 may determine that the metadata item is not valid for said one or more of said at least two media data units.

In some embodiments the scope information may additionally comprise types of information on said one or more of said at least two media data units. Hence, the checksum verifier 714 may derive the second checksum on the basis of the types of information on said one or more of said at least two media data units.

In some embodiments the checksum verifier 714 may remove the metadata item, the first checksum and the scope information from the file, if the first checksum is not equal to the second checksum.

In some embodiments, an apparatus or an entity, such as a file editor, may perform a file editing operation where a container file is modified, for example by adding or removing one or more samples to a track. After the editing operation, the apparatus may verify the validity of the metadata items referred to by or included in the container file as described with relation to FIG. 7b. Metadata items that are found invalid may be removed from the container file and/or references to the metadata items that are invalid may be removed from the container file. Subsequently, the apparatus may derive checksum(s) for the metadata items that are valid for the modified container file as described with relation to FIG. 7a.

When an apparatus (700, 710, or alike) accesses files or resources other than the container file e.g. using a URI or URN, and the files or resources do not reside in the same apparatus as the container file, the accessing may be performed for example using a network connection, such as a wired, wireless (e.g. WLAN) and/or mobile (e.g. GSM, 3G, and/or LTE/4G) connection.

Some example embodiments are described in the following for ISOBMFF. In other words, the first format in various embodiments is ISOBMFF or its derivative and the container file is a file conforming to ISOBMFF or its derivative. Example embodiments described below may refer to pictures of a coded video sequence or a video bitstream, or one or more images. However, it needs to be understood that embodiments are not limited to ISOBMFF but can be applied to any container file format. Furthermore, it needs to be understood that embodiments are not limited to pictures or images but can be applied to samples or access units of any media coding or representation format.

A media data unit in various embodiments is a sample according to ISOBMFF or its derivatives. An ISOBMFF sample may be for example a coded picture or a coded audio or video frame or an image. A second format in various embodiments is a metadata format which may be for example one of the following: an Extensible metadata platform (XMP), which is specified in ISO International Standard 16684-1; an Exchangeable image file format (EXIF), in which the metadata may primarily be stored in the APP1 section of EXIF file format; JPEG-2000 metadata, which is specified for example in ITU-T Recommendations T.800 and T.801; MPEG-7.

A metadata item in various embodiments may be, for example, a metadata item according to ISOBMFF or its derivatives. Metadata items may be identified and characterized in Meta boxes as described earlier. In the following, an embodiment is described where a Meta box resides in a track level and media data units are included in tracks and a media data unit is a sample containing an image.

When images or bursts of images or pictures of a coded video sequence are stored using a track structure of ISOBMFF, the MetaBox may be inserted at the track level. There may be many different metadata schemas in use. Examples of such schemas include XMP and EXIF. In order to support many different metadata schemas, the MetadataContainerBox may be used. One among the schematic representations may be regarded as the preferred meta-data and the others may be indicated by the MetaBoxes in the MetadataContainerBox.

MetaBoxes may be identified by their handler types. Handler types may be defined using four character codes (fourCC codes). Examples of such handler types are now listed.

'jp2h': This handler type refers to JPEG-2000 specific metadata. The primary item may be formatted according to the Image Header box 'ihdr'. Each item shall contain one or more entire boxes.

'jpx': This handler type refers to those XML formatted metadata as specified in Annex N of ITU-T T.801. The primary item may be the payload(s) any of the allowed box(es). Each item may contain one or more entire payload(s).

'xmp': This handler type refers to XMP formatted metadata.

'exif': This handler type refers to metadata contained in the APP1 section of an exif-formatted file.

New metadata schemas might define their own unique handler type fourCC codes to identify the handling of their specific schemas. Additional metadata referring to the same or subset of the samples included in the track may be put into individual MetaBoxes of the MetadataContainerBox; each box may include their unique handler types. This way any number of metadata schemas may be supplied for samples included in a track.

In some embodiments, the scope information indicating said one or more of said at least two media data units may be formatted according to one or more of the following mechanisms of the ISOBMFF: Sample grouping; Sample auxiliary information; or Timed metadata tracks.

The scope information may be indicated using the sample grouping mechanism in different ways including but not limited to the following example embodiments.

Figure 5A:
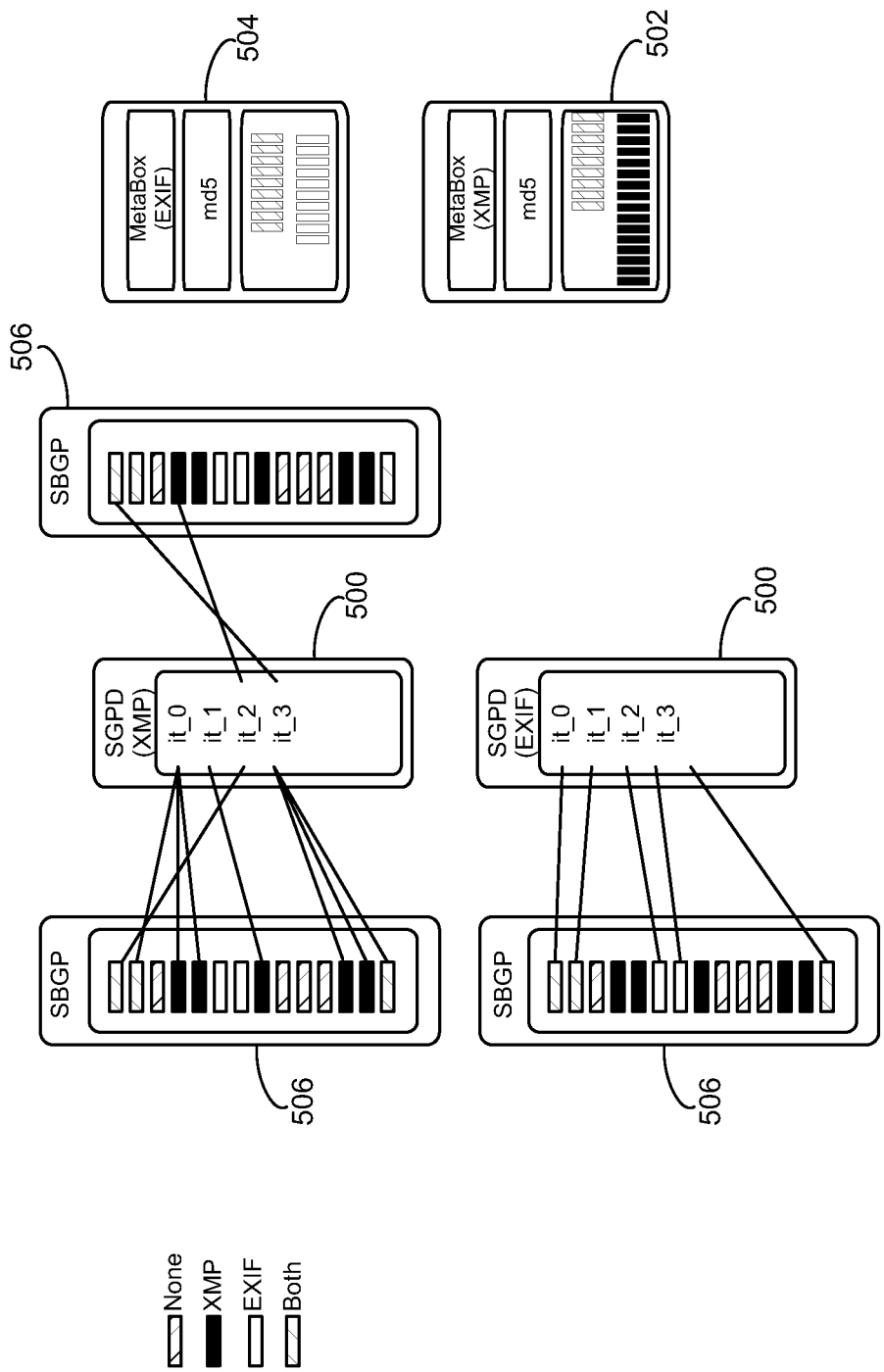
FIG. 5a illustrates an example of one sample group description for each metadata schema.

In the first example embodiment there is described a one sample group description for each metadata schema. This example embodiment can be illustrated with FIG. 5a.

In this example embodiment, a new SampleGroupDescriptionBox 500 is instantiated for each type of metadata schema. For example, if there are samples in the track that are described using both EXIF and XMP type metadata schemas, then two SampleGroupDescriptionBoxes 500 may be made; one for EXIF and the other for XMP. The grouping_type field may assign unique value for each of the SampleGroupDescriptionBoxes. For example, the grouping_type field for the SampleGroupDescriptionBox referring to an XMP type metadata 502 is set the integer representation of the fourCC string 'xmp', while the one referring to the EXIF type metadata 504 is set to the integer representation of the fourCC string 'exif'.

A new VisualSampleGroupEntry called the VisualSampleToMetadataItemEntry (vsmi) is made for each item entry for the metadata schema relevant to the GroupingType of the SampleGroupDescriptionBox. The VisualSampleToMetadatItemEntry may carry within it an item_id defined in the metadata schema pertaining to the GroupingType. Samples in the track may then be linked to the appropriate SampleGroupDescriptionBoxes and the VisualSampleToMetadataItemEntry entry by setting the values of grouping_type in the SampleToGroupBox 506 to identify the correct SampleGroupDescriptionBox 500 and the group_description_index to identify the VisualSampleToMetadataItemEntry and hence the item_id of the metadata to which the sample is linked. In some cases it might be so that a sample is linked to multiple items in the same SampleGroupDescriptionBox 500. In such cases a new SampleToGroupBox 506 may be constructed to provide the needed additional linkage to items_ids.

Figure 5B:
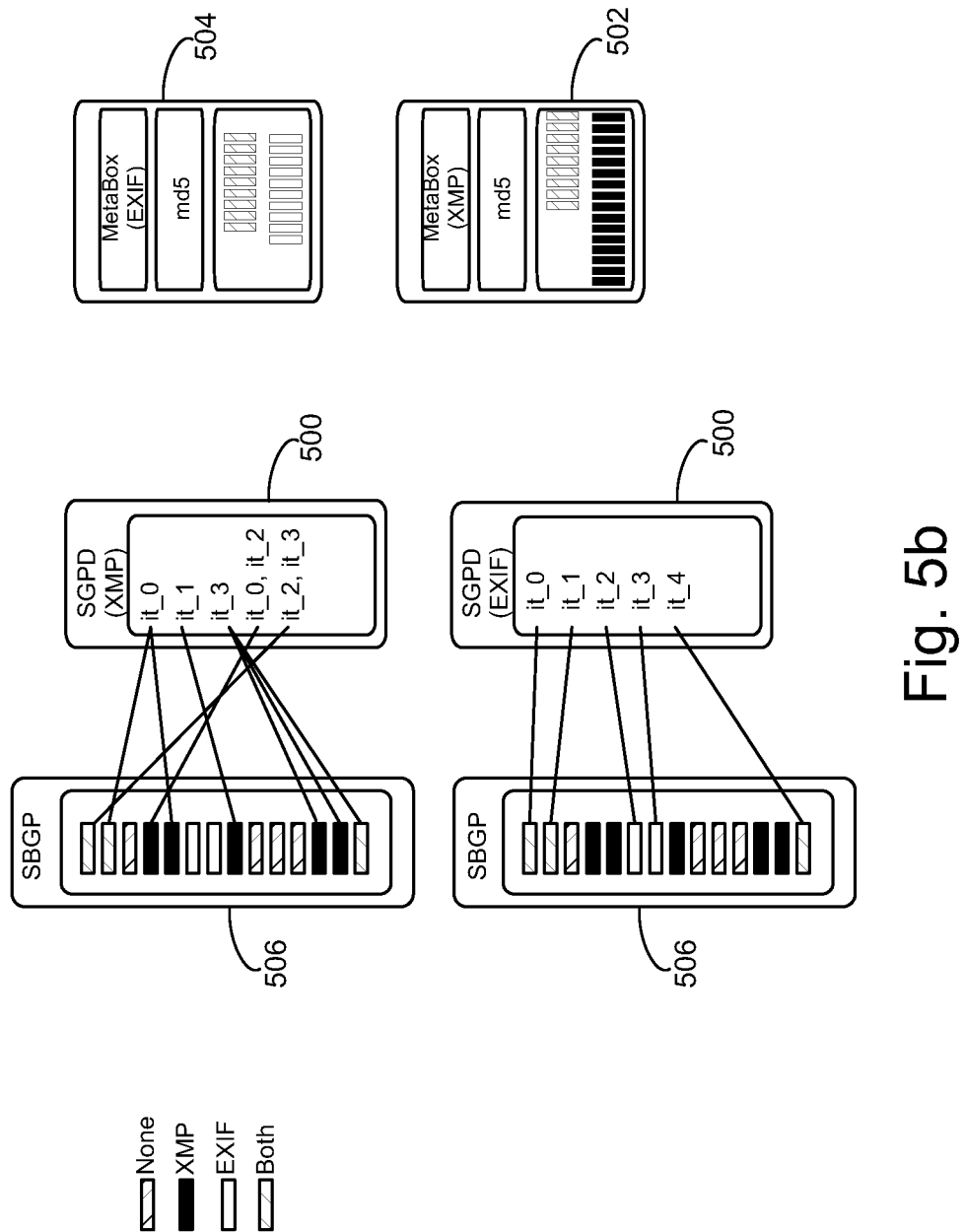
FIG. 5b illustrates an example of one sample group description and one sample-to-group box for each metadata schema.

In the second example embodiment there is described a one sample group description and one sample-to-group box for each metadata schema. This example embodiment can be illustrated with FIG. 5b.

In this example embodiment similarly to the previous example embodiment, a new SampleGroupDescriptionBox 500 may be instantiated for each type of metadata schema. For example, if there are samples in the track that are described using both EXIF and XMP type metadata schemas, then two SampleGroupDescriptionBoxes 500 may be made; one for EXIF and the other for XMP.

A new VisualSampleGroupEntry called the VisualSampleToMetadataItemEntry (vsmi) may be made for each item entry for the metadata schema relevant to the GroupingType of the sampleGroupDescriptionBox 500. The VisualSampleToMetadatItemEntry may carry within it one or more item_id values defined in the metadata schema pertaining to the GroupingType. The number of item_id values may be indicated in the VisualSampleToMetadatItemEntry or may be inferred. Samples in the track may then be linked to the appropriate SampleGroupDescriptionBoxes 500 and the VisualSampleToMetadataItemEntry entry by setting in the SampleToGroupBox 506 the values of grouping_type to identify the correct SampleGroupDescriptionBox and the group_description_index to identify the item_id values of the metadata 502, 504 to which the sample is linked.

Figure 5C:
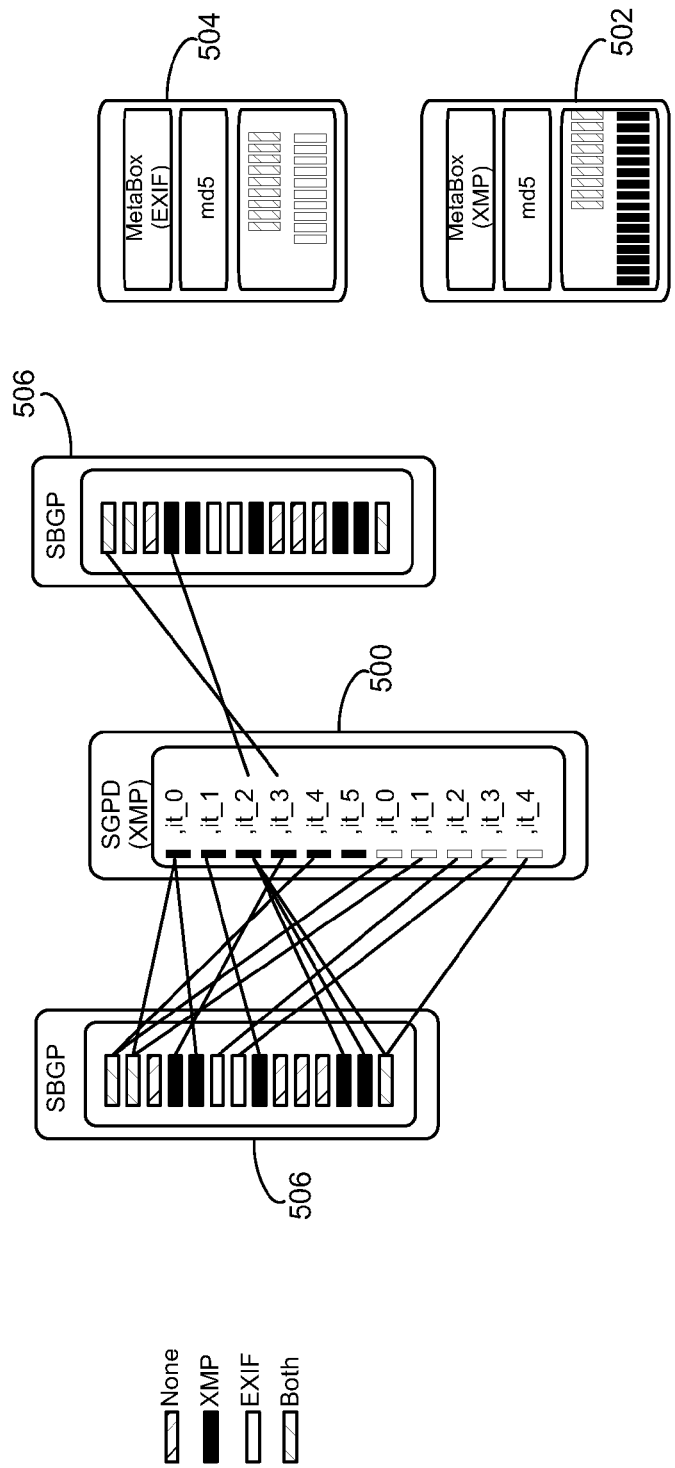
FIG. 5c illustrates an example of one sample group description for all metadata schemas.

In the third example embodiment there is described a one sample group description for all metadata schemas. This example embodiment can be illustrated with FIG. 5c.

In this example embodiment the SampleGroupDescriptionBox 500 may provide information about the metadata schemas in use. The grouping type for this SampleGroupDescriptionBox 500 may be given a generic 4cc; for example the integer representation of the fourCC string 'smds' (sample to metadata schema).

A new VisualSampleGroupEntry called the VisualSampleToMetadataItemEntry (vsmi) may be made for each item entry in 'smds' SampleGroupDescriptionBox 500. The VisualSampleToMetadatItemEntry may carry within it the handler type fourCC identifying the Meta Box 502, 504 it is linked to and one or more item_id values. For example, for XMP type metadata the VisualSampleToMetadataItemEntry may hold the integer representation of the fourCC 'xmp'.

The syntax of the VisualSampleToMetadataItemEntry may be for example as follows.

```
class VisualSampleToMetadataItemEntry( ) extends
VisualSampleGroupEntry ('vsmi')
{
unsigned int(32) meta_box_handler_type;
unsigned int(16) item_id;
}
```

In another example, the syntax of the VisualSampleToMetadataItemEntry may be for example as follows.

```
class VisualSampleToMetadataItemEntry( ) extends
VisualSampleGroupEntry ('vsmi')
{
unsigned int(32) meta_box_handler_type;
    unsigned int(16) num_items;
    for(i = 0; i < num_items; i++)
    unsigned int(16) item_id[i];
}
```

The samples may then be linked to the SampleGroupDescriptionBox 500 'smds' using the SampleToGroupBox 506 with grouping_type field equal to 'smds'. An input to the SampleToGroupBox may be the box version. In the specific case when version one of this box is used, the additional facility of providing a grouping_type_parameter may be useful in indicating any subtype of the grouping. For the SampleToMetadataBox 'smds' sample grouping this grouping_type_parameter may be used to discriminate between the different metadata schemas that a sample can have. The grouping_type_parameter may be set, by a file creator or alike, equal to the handler_type of the Meta Box 502, 504 to which the samples included in this SampleToGroupBox 506 are mapped to. Alternatively, the grouping_type_parameter, by a file creator or alike, equal to the item_type of the referred meta items. The item_type may be provided in the ItemInfoEntry structure within the Item Information box, which may be used to provide additional information for meta items. Not all samples in the track need to be a member of the SampleToMetadataBox. Those samples that are not members of this sample group may be concluded to have no metadata specified for it.

Figure 5D:
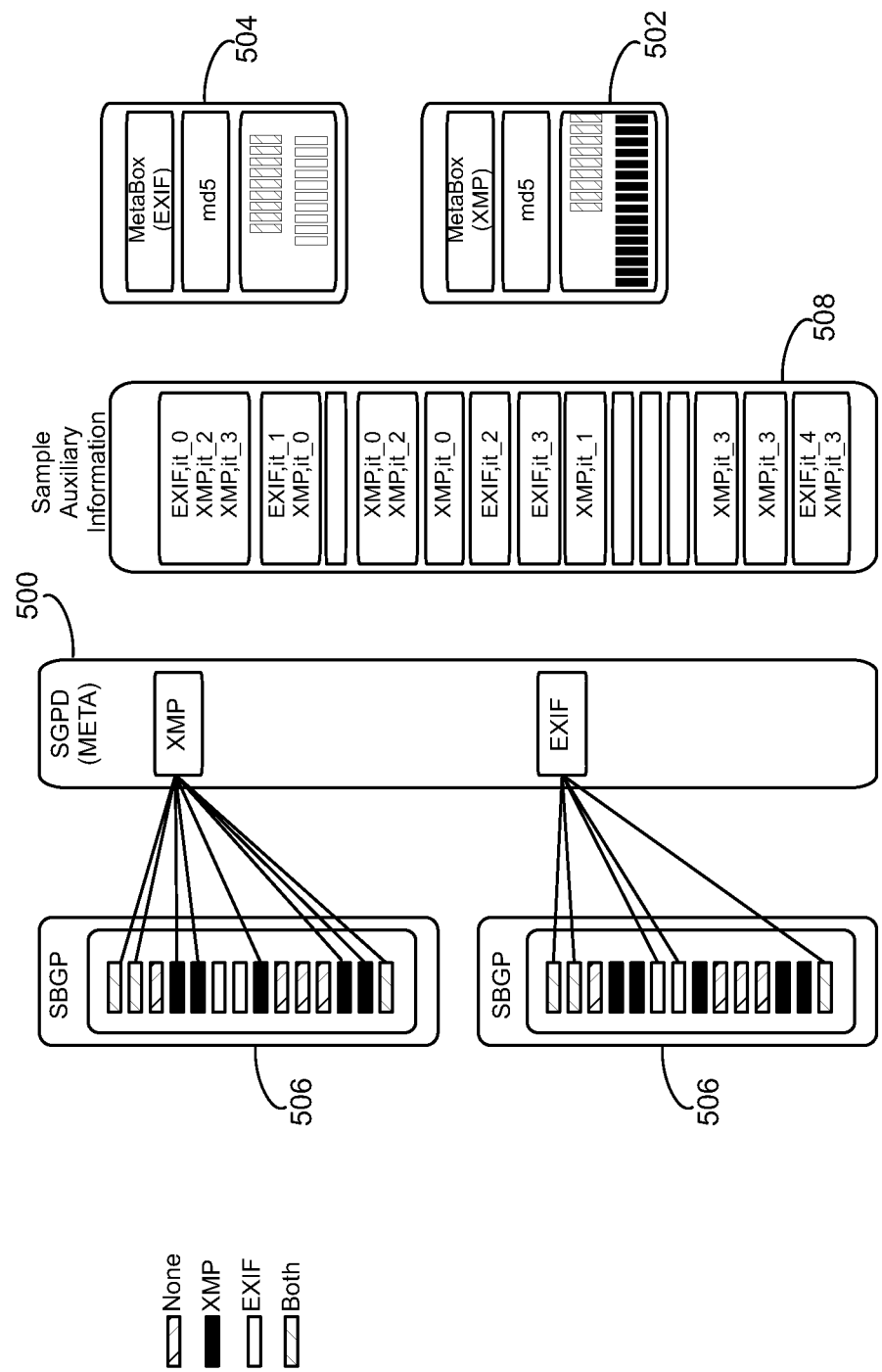
FIG. 5d illustrates an example of joint usage sample grouping and sample auxiliary information.

In the fourth example embodiment there is described a joint usage of sample grouping and sample auxiliary information. This example embodiment can be illustrated with FIG. 5d.

In this example embodiment the SampleGroupDescriptionBox 500 may provide information about the metadata schemas in use. The grouping type for this SampleGroupDescriptionBox 500 may be given a generic 4cc; for example the integer representation of the fourCC string 'vsmi'.

A new VisualSampleGroupEntry called the VisualSampleToMetadataItemEntry (vsmi) may be made for each item entry in 'vsmi' SampleGroupDescriptionBox 500. The VisualSampleToMetadatItemEntry may carry within it the handler type fourCC identifying the Meta Box 502, 504 it is linked to. For example, for XMP type metadata the VisualSampleToMetadataItemEntry may hold the integer representation of the fourCC 'xmp'.

The samples may then be linked to the SampleGroupDescriptionBox 500 'vsmi' using the SampleToGroupBox 506 with grouping_type field equal to 'vsmi'. Samples having a particular type of metadata, e.g. XMP, may be linked to the corresponding sample group description index which, continuing the same example, may contain fourCC 'xmp'. In some embodiments, the grouping_type_parameter may be used to contain the handler_type of the MetaBox. The SampleToGroupBox may therefore be able to indicate which type or format of metadata is available for any particular sample addressed by the box.

The linking of each sample to the item_id in the metadata schemas may be provided in the sample auxiliary information 508. The syntax of sample auxiliary information may for example include a list of tuples. Each tuple may contain the handler_type of the Meta Box 502, 504 and the item_id to which the sample is associated.

In some embodiments, only sample auxiliary information 508, such as described above, may be in use and no sample grouping is used.

In some embodiments, a timed metadata track may be in use in addition to or instead of other mechanisms described earlier, where the sample entry may indicate that that track links metadata items to samples. The sample entry may additionally or alternatively indicate the handler_type value or values of the Meta Box 502, 504 for which the track contains links. The sample format for such a metadata track may for example be similar or identical to the format of the sample auxiliary information 508 as described above.

With some embodiments above, samples with metadata may be linked to their associated metadata schemas more tightly that before. This, however, may not always be sufficient enough to guarantee that the samples and their metadata are consistent.

Manipulation of samples in the image track can be thought of as a frequent operation. Such manipulations may include changing the nature of the sample itself, addition of new samples to the image track, and deletion of samples included in the track. Nothing binds an entity that does such manipulations on a sample to know about the metadata schema defined with regards to the sample. Hence, these entities may simply ignore the metadata. Frequent such manipulations by such entities may make the metadata completely out of sync with the actual samples and their characteristics in the track. Hence, it may be desirable to have a mechanism that can validate the metadata defined in a track so that an entity that can understand both the samples as well as some subset of the metadata schemas defined on the samples in the track knows if the metadata really matches the samples.

Some embodiments are described in the following for including in the container file a checksum derived from information on said one or more of said at least two media data units.

The inclusion in the container file may be done as follows. A new optional box called the MetadataIntegrityBox (fourCC: 'mint') may be defined and may be contained by a MetaBox. The syntax of the box may for example be as follows.

```
aligned(8) class MetadataIntegrityBox
    extends FullBox('mint', version = 0, 0) {
        MD5IntegrityBox( ); // one or more MD5IntegrityBox
    }
```

The syntax of the MD5IntegrityBox may be as follows:

```
aligned(8) class MD5IntegrityBox
    extends FullBox('md5i', version = 0, 0) {
        string input_MD5;
        unsigned int(32) input_4cc;
        if (not end of box)
            unsigned int(32) grouping_type;
    }
```

The field input_MD5 may be a null-terminated string of UTF-8 characters containing a base64 encoded MD5 digest of the input data. One method of calculating the string is specified in RFC 1864.

It should be understood that instead of or in addition to MD5, other types of integrity check schemes could be used, such as different forms of the cyclic redundancy check (CRC), such as the CRC scheme used in ITU-T Recommendation H.271.

The input data over which the MD5 string is computed may be specified by the input_4CC. When this value of this field is 'stsz', sizes of the samples for which the metadata in the MetaBox concerns, may be used for computing the MD5 string. When the value of the field is 'mdat' then the entire coded sample data for which the metadata in the MetaBox concerns may be used for computing the MD5 string.

Additionally, if there is a grouping_type field in the box, it may signal that the md5 string is computed for a certain sample group indicated by the grouping_type. If this field is not present in the box, it may be assumed that all samples in the track are considered for computing the md5 string. The grouping_type field may be optional and may be present only if the length of the box indicates that there is more data following the input_4 cc. The grouping_type field may identify the sample group to which describes the samples and its metadata. The grouping_type may for example be equal to 'vsmi' in some embodiments above.

In another example, the syntax of TrackMD5Box may be as follows

```
aligned(8) class TrackMD5Box
    extends FullBox('intg', version = 0, 0) {
        string input_MD5;
        unsigned int(32) input_4cc;
        if( more data in this box ) {
            unsigned int(32) grouping_type;
            if (grouping_type > 0) {
                unsigned int(8) input_version;
                if (input_version == 1)
                    unsigned int(32) input_grouping_type_parameter;
                unsigned int(32) num_indices; // 0 = all indices
                for( i = 0; i < num_indices; i++)
                    unsigned int(32) input_group_description_index[i];
            }
        }
    }
```

The semantics of input_MD5, input_4 cc and grouping_type may be specified identically or similarly to what is described earlier. input_version may be specified to be equal to the version of the SampleToGroupBox that is referred to by this TrackMD5Box. input_grouping_type_parameter, if present, may be specified to be equal to the grouping_type_parameter of the SampleToGroupBox that is referred to by this TrackMD5Box. num_indices may specify the number of sample group description indices referred to by this TrackMD5Box. The md5 string may be computed for those samples that are mapped to any of the input_group_description_index[i] in the SampleToGroupBox referred to by this TrackMD5Box. In some embodiments, the group description index may be for example a 1-based index rather than 0-based index as shown in the syntax or any other indexing mechanism may be used.

Many of the embodiments above provide integrity protection against an editor which modifies the track somehow but does not update the metadata. The metadata may be valid only if the MD5 checksums provided in the box are identical to the MD5 checksums derived from the same structures present in the file.

Particularly, if metadata resides in a separate file and the container file 722 just links to that separate file, it may be desirable to provide an integrity protection mechanism against an editor that modifies the metadata somehow but does not update the container file and/or the media data accordingly. Again, the metadata may be valid only if the MD5 checks provided in the following box are identical to those derived from the indicated items (at the time of parsing the container file). An ItemToTrackIntegrityBox may be specified as follows and may for example be included in the Meta Box that contains or refers to the metadata items for which the integrity is derived.

```
aligned(8) class ItemToTrackIntegrityBox
extends FullBox('itin', version = 0, 0) {
    unsigned int(16) num_items;
    for( i = 0; i < num_items; i++ )
        unsigned int(16) item_ID[i];
    string content_MD5;
}
``` item_id[i] with the value of i in the range of 0 to num_items-1, inclusive, may specify the item_id values for which checksum is derived. content_MD5 may be a null-terminated string in UTF-8 characters containing a base64-encoded MD5 digest of the item data as specified in RFC 1864. The item data may be a concatenation of the items with item_id[i] for values of i in the range of 0 to num_items-1 in ascending order.

Additionally, the ItemToTrackIntegrityBox may include syntax elements identifying a sample group and/or particular sample group description indices of a particular sample group which relate to content_MD5. In other words, the samples which relate to content_MD5 may be additionally indicated. If the checksum counted over the identified items at the time of parsing the file is equal to content_MD5, the metadata in the identified items may be determined to be valid for the samples which relate to content_MD5. If the checksum counted over the identified items at the time of parsing the file is not equal to content_MD5, the metadata in the identified items may be determined to be invalid for the samples which relate to content_MD5.

Another approach (as an alternative to ItemToTrackIntegrityBox) is to extend the ItemInfoEntry with an extension_type of "MD5", and the extension contains an MD5 string only.

Figure 1:
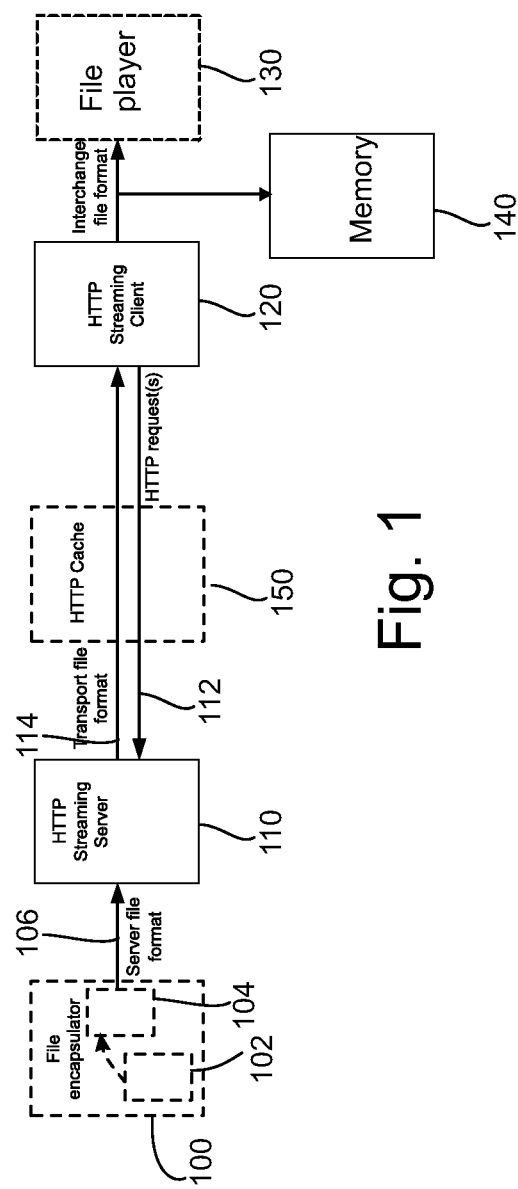
FIG. 1 depicts an example illustration of some functional blocks, formats, and interfaces included in an HTTP streaming system.

In FIG. 1 an example illustration of some functional blocks, formats, and interfaces included in a hypertext transfer protocol (HTTP) streaming system are shown. A file encapsulator 100 takes media bitstreams of a media presentation as input. The bitstreams may already be encapsulated in one or more container files 102. The bitstreams may be received by the file encapsulator 100 while they are being created by one or more media encoders. The file encapsulator converts the media bitstreams into one or more files 104, which can be processed by a streaming server 110 such as the HTTP streaming server. The output 106 of the file encapsulator is formatted according to a server file format. The HTTP streaming server 110 may receive requests from a streaming client 120 such as the HTTP streaming client. The requests may be included in a message or messages according to e.g. the hypertext transfer protocol such as a GET request message. The request may include an address indicative of the requested media stream. The address may be the so called uniform resource locator (URL). The HTTP streaming server 110 may respond to the request by transmitting the requested media file(s) and other information such as the metadata file(s) to the HTTP streaming client 120. The HTTP streaming client 120 may then convert the media file(s) to a file format suitable for play back by the HTTP streaming client and/or by a media player 130. The converted media data file(s) may also be stored into a memory 140 and/or to another kind of storage medium. The HTTP streaming client and/or the media player may include or be operationally connected to one or more media decoders, which may decode the bitstreams contained in the HTTP responses into a format that can be rendered.

Server File Format

A server file format is used for files that the HTTP streaming server 110 manages and uses to create responses for HTTP requests. There may be, for example, the following three approaches for storing media data into file(s).

In a first approach a single metadata file is created for all versions. The metadata of all versions (e.g. for different bitrates) of the content (media data) resides in the same file. The media data may be partitioned into fragments covering certain playback ranges of the presentation. The media data can reside in the same file or can be located in one or more external files referred to by the metadata.

In a second approach one metadata file is created for each version. The metadata of a single version of the content resides in the same file. The media data may be partitioned into fragments covering certain playback ranges of the presentation. The media data can reside in the same file or can be located in one or more external files referred to by the metadata.

In a third approach one file is created per each fragment. The metadata and respective media data of each fragment covering a certain playback range of a presentation and each version of the content resides in their own files. Such chunking of the content to a large set of small files may be used in a possible realization of static HTTP streaming. For example, chunking of a content file of duration 20 minutes and with 10 possible representations (5 different video bitrates and 2 different audio languages) into small content pieces of 1 second, would result in 12000 small files. This may constitute a burden on web servers, which has to deal with such a large amount of small files.

The first and the second approach i.e. a single metadata file for all versions and one metadata file for each version, respectively, are illustrated in FIG. 2 using the structures of the ISO base media file format. In the example of FIG. 2, the metadata is stored separately from the media data, which is stored in external file(s). The metadata is partitioned into fragments 207a, 214a; 207b, 214b covering a certain playback duration. If the file contains tracks 207a, 207b that are alternatives to each other, such as the same content coded with different bitrates, FIG. 2 illustrates the case of a single metadata file for all versions; otherwise, it illustrates the case of one metadata file for each version.

HTTP Streaming Server

A HTTP streaming server 110 takes one or more files of a media presentation as input. The input files are formatted according to a server file format. The HTTP streaming server 110 responds 114 to HTTP requests 112 from a HTTP streaming client 120 by encapsulating media in HTTP responses. The HTTP streaming server outputs and transmits a file or many files of the media presentation formatted according to a transport file format and encapsulated in HTTP responses.

Figure 3:
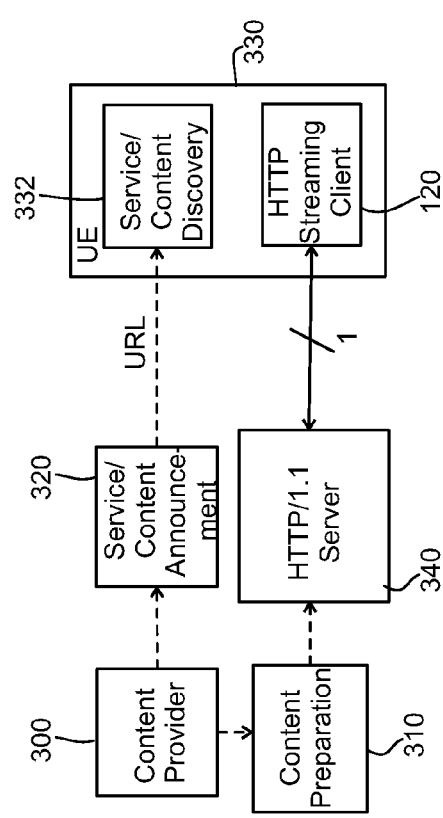
FIG. 3 illustrates an example of a regular web server operating as a HTTP streaming server.

In some embodiments the HTTP streaming servers 110 can be coarsely categorized into three classes. The first class is a web server, which is also known as a HTTP server, in a "static" mode. In this mode, the HTTP streaming client 120 may request one or more of the files of the presentation, which may be formatted according to the server file format, to be transmitted entirely or partly. The server is not required to prepare the content by any means. Instead, the content preparation is done in advance, possibly offline, by a separate entity. FIG. 3 illustrates an example of a web server as a HTTP streaming server. A content provider 300 may provide a content for content preparation 310 and an announcement of the content to a service/content announcement service 320. The user device 330, which may contain the HTTP streaming client 120, may receive information regarding the announcements from the service/content announcement service 320 wherein the user of the user device 330 may select a content for reception. The service/content announcement service 320 may provide a web interface and consequently the user device 330 may select a content for reception through a web browser in the user device 330. Alternatively or in addition, the service/content announcement service 320 may use other means and protocols such as the Service Advertising Protocol (SAP), the Really Simple Syndication (RSS) protocol, or an Electronic Service Guide (ESG) mechanism of a broadcast television system. The user device 330 may contain a service/content discovery element 332 to receive information relating to services/contents and e.g. provide the information to a display of the user device. The streaming client 120 may then communicate with the web server 340 to inform the web server 340 of the content the user has selected for downloading. The web server 340 may the fetch the content from the content preparation service 310 and provide the content to the HTTP streaming client 120.

Figure 4:
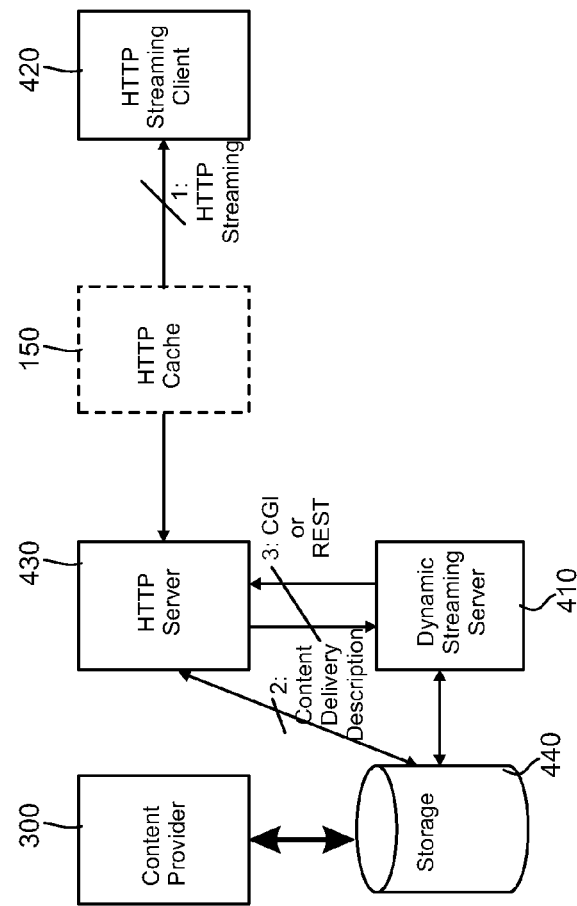
FIG. 4 illustrates an example of a regular web server connected with a dynamic streaming server.

The second class is a (regular) web server operationally connected with a dynamic streaming server as illustrated in FIG. 4. The dynamic streaming server 410 dynamically tailors the streamed content to a client 420 based on requests from the client 420. The HTTP streaming server 430 interprets the HTTP GET request from the client 420 and identifies the requested media samples from a given content. The HTTP streaming server 430 then locates the requested media samples in the content file(s) or from the live stream. It then extracts and envelopes the requested media samples in a container 440. Subsequently, the newly formed container with the media samples is delivered to the client in the HTTP GET response body.

The first interface "1" in FIGS. 3 and 4 is based on the HTTP protocol and defines the syntax and semantics of the HTTP Streaming requests and responses. The HTTP Streaming requests/responses may be based on the HTTP GET requests/responses.

The second interface "2" in FIG. 4 enables access to the content delivery description. The content delivery description, which may also be called as a media presentation description, may be provided by the content provider 450 or the service provider. It gives information about the means to access the related content. In particular, it describes if the content is accessible via HTTP Streaming and how to perform the access. The content delivery description is usually retrieved via HTTP GET requests/responses but may be conveyed by other means too, such as by using SAP, RSS, or ESG.

The third interface "3" in FIG. 4 represents the Common Gateway Interface (CGI), which is a standardized and widely deployed interface between web servers and dynamic content creation servers. Other interfaces such as a representational State Transfer (REST) interface are possible and would enable the construction of more cache-friendly resource locators.

The Common Gateway Interface (CGI) defines how web server software can delegate the generation of web pages to a console application. Such applications are known as CGI scripts; they can be written in any programming language, although scripting languages are often used. One task of a web server is to respond to requests for web pages issued by clients (usually web browsers) by analyzing the content of the request, determining an appropriate document to send in response, and providing the document to the client. If the request identifies a file on disk, the server can return the contents of the file. Alternatively, the content of the document can be composed on the fly. One way of doing this is to let a console application compute the document's contents, and inform the web server to use that console application. CGI specifies which information is communicated between the web server and such a console application, and how.

The representational State Transfer is a style of software architecture for distributed hypermedia systems such as the World Wide Web (WWW). REST-style architectures consist of clients and servers. Clients initiate requests to servers; servers process requests and return appropriate responses. Requests and responses are built around the transfer of "representations" of "resources". A resource can be essentially any coherent and meaningful concept that may be addressed. A representation of a resource may be a document that captures the current or intended state of a resource. At any particular time, a client can either be transitioning between application states or at rest. A client in a rest state is able to interact with its user, but creates no load and consumes no per-client storage on the set of servers or on the network. The client may begin to send requests when it is ready to transition to a new state. While one or more requests are outstanding, the client is considered to be transitioning states. The representation of each application state contains links that may be used next time the client chooses to initiate a new state transition.

The third class of the HTTP streaming servers according to this example classification is a dynamic HTTP streaming server. Otherwise similar to the second class, but the HTTP server and the dynamic streaming server form a single component. In addition, a dynamic HTTP streaming server may be state-keeping.

Server-end solutions can realize HTTP streaming in two modes of operation: static HTTP streaming and dynamic HTTP streaming. In the static HTTP streaming case, the content is prepared in advance or independent of the server. The structure of the media data is not modified by the server to suit the clients' needs. A regular web server in "static" mode can only operate in static HTTP streaming mode. In the dynamic HTTP streaming case, the content preparation is done dynamically at the server upon receiving a non-cached request. A regular web server operationally connected with a dynamic streaming server and a dynamic HTTP streaming server can be operated in the dynamic HTTP streaming mode.

Transport File Format

In an example embodiment transport file formats can be coarsely categorized into two classes. In the first class transmitted files are compliant with an existing file format that can be used for file playback. For example, transmitted files are compliant with the ISO Base Media File Format or the progressive download profile of the 3GPP file format.

In the second class transmitted files are similar to files formatted according to an existing file format used for file playback. For example, transmitted files may be fragments of a server file, which might not be self-containing for playback individually. In another approach, files to be transmitted are compliant with an existing file format that can be used for file playback, but the files are transmitted only partially and hence playback of such files requires awareness and capability of managing partial files.

Transmitted files can usually be converted to comply with an existing file format used for file playback.

HTTP Cache

An HTTP cache 150 (FIG. 1) may be a regular web cache that stores HTTP requests and responses to the requests to reduce bandwidth usage, server load, and perceived lag. If an HTTP cache contains a particular HTTP request and its response, it may serve the requestor instead of the HTTP streaming server.

HTTP streaming client

An HTTP streaming client 120 receives the file(s) of the media presentation. The HTTP streaming client 120 may contain or may be operationally connected to a media player 130 which parses the files, decodes the included media streams and renders the decoded media streams. The media player 130 may also store the received file(s) for further use. An interchange file format can be used for storage.

In some example embodiments the HTTP streaming clients can be coarsely categorized into at least the following two classes. In the first class conventional progressive downloading clients guess or conclude a suitable buffering time for the digital media files being received and start the media rendering after this buffering time. Conventional progressive downloading clients do not create requests related to bitrate adaptation of the media presentation.

In the second class active HTTP streaming clients monitor the buffering status of the presentation in the HTTP streaming client and may create requests related to bitrate adaptation in order to guarantee rendering of the presentation without interruptions.

The HTTP streaming client 120 may convert the received HTTP response payloads formatted according to the transport file format to one or more files formatted according to an interchange file format. The conversion may happen as the HTTP responses are received, i.e. an HTTP response is written to a media file as soon as it has been received. Alternatively, the conversion may happen when multiple HTTP responses up to all HTTP responses for a streaming session have been received.

Interchange File Formats

In some example embodiments the interchange file formats can be coarsely categorized into at least the following two classes. In the first class the received files are stored as such according to the transport file format.

In the second class the received files are stored according to an existing file format used for file playback.

A Media File Player

A media file player 130 may parse, verify, decode, and render stored files. A media file player 130 may be capable of parsing, verifying, decoding, and rendering either or both classes of interchange files. A media file player 130 is referred to as a legacy player if it can parse and play files stored according to an existing file format but might not play files stored according to the transport file format. A media file player 130 is referred to as an HTTP streaming aware player if it can parse and play files stored according to the transport file format.

In some implementations, an HTTP streaming client merely receives and stores one or more files but does not play them. In contrast, a media file player parses, verifies, decodes, and renders these files while they are being received and stored.

In some implementations, the HTTP streaming client 120 and the media file player 130 are or reside in different devices. In some implementations, the HTTP streaming client 120 transmits a media file formatted according to a interchange file format over a network connection, such as a wireless local area network (WLAN) connection, to the media file player 130, which plays the media file. The media file may be transmitted while it is being created in the process of converting the received HTTP responses to the media file. Alternatively, the media file may be transmitted after it has been completed in the process of converting the received HTTP responses to the media file. The media file player 130 may decode and play the media file while it is being received. For example, the media file player 130 may download the media file progressively using an HTTP GET request from the HTTP streaming client. Alternatively, the media file player 130 may decode and play the media file after it has been completely received.

HTTP pipelining is a technique in which multiple HTTP requests are written out to a single socket without waiting for the corresponding responses. Since it may be possible to fit several HTTP requests in the same transmission packet such as a transmission control protocol (TCP) packet, HTTP pipelining allows fewer transmission packets to be sent over the network, which may reduce the network load.

A connection may be identified by a quadruplet of server IP address, server port number, client IP address, and client port number. Multiple simultaneous TCP connections from the same client to the same server are possible since each client process is assigned a different port number. Thus, even if all TCP connections access the same server process (such as the Web server process at port 80 dedicated for HTTP), they all have a different client socket and represent unique connections. This is what enables several simultaneous requests to the same Web site from the same computer.

Categorization of Multimedia Formats

The multimedia container file format is an element used in the chain of multimedia content production, manipulation, transmission and consumption. There may be substantial differences between a coding format (also known as an elementary stream format) and a container file format. The coding format relates to the action of a specific coding algorithm that codes the content information into a bitstream. The container file format comprises means of organizing the generated bitstream in such way that it can be accessed for local decoding and playback, transferred as a file, or streamed, all utilizing a variety of storage and transport architectures. Furthermore, the file format can facilitate interchange and editing of the media as well as recording of received real-time streams to a file. An example of the hierarchy of multimedia file formats is described in FIGS. 5a-5d.

FIG. 11 is a graphical representation of an example of a generic multimedia communication system within which various embodiments may be implemented. As shown in FIG. 11, a data source 1500 provides a source signal in an analog, uncompressed digital, or compressed digital format, or any combination of these formats. An encoder 1510 encodes the source signal into a coded media bitstream. It should be noted that a bitstream to be decoded can be received directly or indirectly from a remote device located within virtually any type of network. Additionally, the bitstream can be received from local hardware or software. The encoder 1510 may be capable of encoding more than one media type, such as audio and video, or more than one encoder 1510 may be required to code different media types of the source signal. The encoder 1510 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in FIG. 11 only one encoder 1510 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream is transferred to a storage 1520. The storage 1520 may comprise any type of mass memory to store the coded media bitstream. The format of the coded media bitstream in the storage 1520 may be an elementary self-contained bitstream format, or one or more coded media bitstreams may be encapsulated into a container file. Some systems operate "live", i.e. omit storage and transfer coded media bitstream from the encoder 1510 directly to the sender 1530. The coded media bitstream is then transferred to the sender 1530, also referred to as the server, on a need basis. The format used in the transmission may be an elementary self-contained bitstream format, a packet stream format, or one or more coded media bitstreams may be encapsulated into a container file. The encoder 1510, the storage 1520, and the sender 1530 may reside in the same physical device or they may be included in separate devices. The encoder 1510 and sender 1530 may operate with live real-time content, in which case the coded media bitstream is typically not stored permanently, but rather buffered for small periods of time in the content encoder 1510 and/or in the sender 1530 to smooth out variations in processing delay, transfer delay, and coded media bitrate.

The sender 1530 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 1530 encapsulates the coded media bitstream into packets. For example, when RTP is used, the sender 1530 encapsulates the coded media bitstream into RTP packets according to an RTP payload format. Typically, each media type has a dedicated RTP payload format. It should be again noted that a system may contain more than one sender 1530, but for the sake of simplicity, the following description only considers one sender 1530.

If the media content is encapsulated in a container file for the storage 1520 or for inputting the data to the sender 1530, the sender 1530 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISO Base Media File Format, for encapsulation of the at least one of the contained media bitstream on the communication protocol.

The sender 1530 may or may not be connected to a gateway 1540 through a communication network. The gateway 1540 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 1540 include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 1540 is called an RTP mixer or an RTP translator and typically acts as an endpoint of an RTP connection.

The system includes one or more receivers 1550, typically capable of receiving, de-modulating, and de-capsulating the transmitted signal into a coded media bitstream. The coded media bitstream is transferred to a recording storage 1555. The recording storage 1555 may comprise any type of mass memory to store the coded media bitstream. The recording storage 1555 may alternatively or additively comprise computation memory, such as random access memory. The format of the coded media bitstream in the recording storage 1555 may be an elementary self-contained bitstream format, or one or more coded media bitstreams may be encapsulated into a container file. If there are multiple coded media bitstreams, such as an audio stream and a video stream, associated with each other, a container file is typically used and the receiver 1550 comprises or is attached to a container file generator producing a container file from input streams. Some systems operate "live," i.e. omit the recording storage 1555 and transfer coded media bitstream from the receiver 1550 directly to the decoder 1560. In some systems, only the most recent part of the recorded stream, e.g., the most recent 10-minute excerption of the recorded stream, is maintained in the recording storage 1555, while any earlier recorded data is discarded from the recording storage 1555.

The coded media bitstream is transferred from the recording storage 1555 to the decoder 1560. If there are many coded media bitstreams, such as an audio stream and a video stream, associated with each other and encapsulated into a container file, a file parser (not shown in the figure) is used to decapsulate each coded media bitstream from the container file. The recording storage 1555 or a decoder 1560 may comprise the file parser, or the file parser is attached to either recording storage 1555 or the decoder 1560.

The coded media bitstream may be processed further by a decoder 1560, whose output is one or more uncompressed media streams. Finally, a renderer 1570 may reproduce the uncompressed media streams with a loudspeaker or a display, for example. The receiver 1550, recording storage 1555, decoder 1560, and renderer 1570 may reside in the same physical device or they may be included in separate devices.

Figure 9:
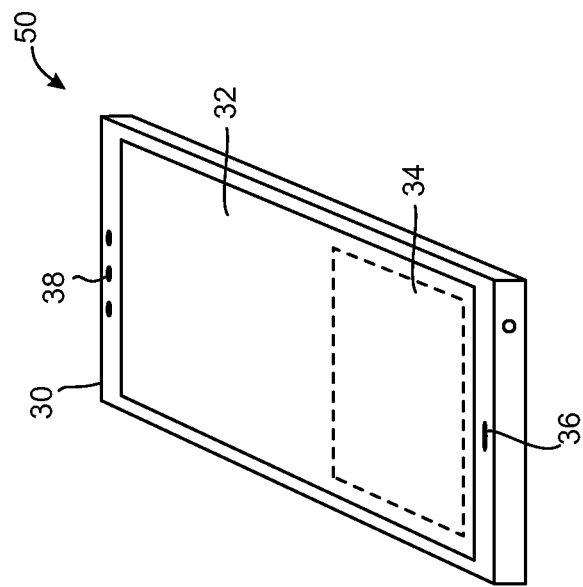
FIG. 9 shows schematically a user equipment suitable for employing some embodiments of the invention.
Figure 8:
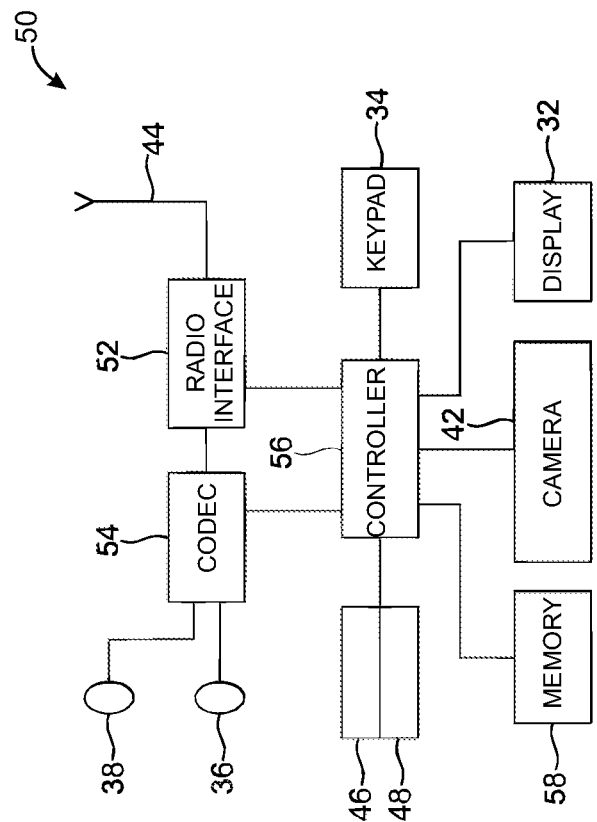
FIG. 8 shows schematically an electronic device employing some embodiments of the invention.

FIG. 8 shows a block diagram of a video coding system according to an example embodiment as a schematic block diagram of an exemplary apparatus or electronic device 50, which may incorporate a codec according to an embodiment of the invention. FIG. 9 shows a layout of an apparatus according to an example embodiment. The elements of FIGS. 8 and 9 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise a camera 42 capable of recording or capturing images and/or video. In some embodiments the apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

FIG. 10 shows an arrangement for video coding comprising a plurality of apparatuses, networks and network elements according to an example embodiment. With respect to FIG. 10, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention. For example, the system shown in FIG. 10 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIGS. 1 and 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatuses, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys Inc., of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

In a first example, there is provided a method comprising:
receiving a container file according to a first format, the container file including or referring to at least two media data units;
receiving a metadata item according to a second format different from the first format, the metadata item being valid for one or more of said at least two media data units, the container file including or referring to the metadata item; and parsing from the container file scope information indicating said one or more of said at least two media data units;
selecting one or more of said at least two media data units on the basis of the scope information; and
determining the validity of the metadata item for said one or more of said at least two media data units.

In an embodiment, the method further comprises:
parsing from the container file a first checksum;
selecting one or more of said at least two media data units on the basis of the scope information;
deriving a second checksum from information on said one or more of said at least two media data units;
comparing the first checksum and the second checksum;
determining at least one of the following:
if the first checksum is equal to the second checksum, determining that the metadata item is valid for said one or more of said at least two media data units;
if the first checksum is not equal to the second checksum, determining that the metadata item is not valid for said one or more of said at least two media data units.

In an embodiment the scope information additionally comprises types of information on said one or more of said at least two media data units, wherein the method further comprises:
deriving the second checksum on the basis of the types of information on said one or more of said at least two media data units.

In an embodiment, the method further comprises:
removing the metadata item, the first checksum and the scope information from the file, if the first checksum is not equal to the second checksum.

In a second example, there is provided an apparatus comprising at least one processor and at least one memory, said at least one memory stored with code thereon, which when executed by said at least one processor, causes an apparatus to perform at least the following:
receive a container file according to a first format, the container file including or referring to at least two media data units;
receive a metadata item according to a second format different from the first format, the metadata item being valid for one or more of said at least two media data units, the container file including or referring to the metadata item; and
parse from the container file scope information indicating said one or more of said at least two media data units;
select one or more of said at least two media data units on the basis of the scope information; and
determine the validity of the metadata item for said one or more of said at least two media data units.

In a third example, there is provided a computer program product embodied on a non-transitory computer readable medium, comprising computer program code configured to, when executed on at least one processor, cause an apparatus or a system to:
receive a container file according to a first format, the container file including or referring to at least two media data units;
receive a metadata item according to a second format different from the first format, the metadata item being valid for one or more of said at least two media data units, the container file including or referring to the metadata item; and
parse from the container file scope information indicating said one or more of said at least two media data units;
select one or more of said at least two media data units on the basis of the scope information; and
determine the validity of the metadata item for said one or more of said at least two media data units.

In a fourth example, there is provided a method comprising:
obtaining or generating a container file according to a first format, the container file including or referring to at least two media data units;
obtaining or generating a metadata item according to a second format different from the first format, the metadata item being valid for one or more of said at least two media data units, the container file including or referring to the metadata item; and
including in the container file scope information indicating said one or more of said at least two media data units.

In an embodiment, the method further comprises:
including in the container file a checksum derived from information on said one or more of said at least two media data units.

In an embodiment, the method further comprises:
including in the container file scope information additionally indicating types of information on said one or more of said at least two media data units used for deriving the checksum.

In an embodiment the types of information comprise at least one of the following:
size of each of said one or more of said at least two media data units;
said one or more of said at least two media data units.

In an embodiment the scope information comprises a sample group for associating said one or more of said at least two media data units with the metadata item.

In a fifth example, there is provided an apparatus comprising at least one processor and at least one memory, said at least one memory stored with code thereon, which when executed by said at least one processor, causes an apparatus to perform at least the following:
obtain or generate a container file according to a first format, the container file including or referring to at least two media data units;
obtain or generate a metadata item according to a second format different from the first format, the metadata item being valid for one or more of said at least two media data units, the container file including or referring to the metadata item; and
include in the container file scope information indicating said one or more of said at least two media data units.

In a sixth example, there is provided a computer program product embodied on a non-transitory computer readable medium, comprising computer program code configured to, when executed on at least one processor, cause an apparatus or a system to:
obtain or generate a container file according to a first format, the container file including or referring to at least two media data units;
obtain or generate a metadata item according to a second format different from the first format, the metadata item being valid for one or more of said at least two media data units, the container file including or referring to the metadata item; and
include in the container file scope information indicating said one or more of said at least two media data units.

In a seventh example, there is provided an apparatus configured to perform the method of the first example.
In an eighth example, there is provided an apparatus configured to perform the method of the second example.

The invention claimed is:

1. A method comprising:
    receiving a container file according to a first format, the container file including or referring to at least two media data units;
    receiving a metadata item according to a second format different from the first format, the metadata item being valid for one or more of said at least two media data units, the container file including or referring to the metadata item;
    parsing from the container file scope information indicating said one or more of said at least two media data units, wherein the scope information additionally comprises types of information on said one or more of said at least two media data units;
    parsing from the container file a first checksum;
    selecting one or more of said at least two media data units on the basis of the scope information;
    deriving a second checksum on the basis of the types of information on said one or more of said at least two media data units;
    comparing the first checksum and the second checksum; and
    determining at least one of the following:
    when the first checksum is equal to the second checksum, determining that the metadata item is valid for said one or more of said at least two media data units; or
    when the first checksum is not equal to the second checksum, determining that the metadata item is not valid for said one or more of said at least two media data units.

2. The method according to claim 1 further comprising:
    removing the metadata item, the first checksum and the scope information from the file, when the first checksum is not equal to the second checksum.

3. An apparatus comprising at least one processor and at least one memory, said at least one memory stored with code thereon, which when executed by said at least one processor, causes an apparatus to:
    receive a container file according to a first format, the container file including or referring to at least two media data units;
    receive a metadata item according to a second format different from the first format, the metadata item being valid for one or more of said at least two media data units, the container file including or referring to the metadata item;
    parse from the container file scope information indicating said one or more of said at least two media data units, wherein the scope information additionally comprises types of information on said one or more of said at least two media data units;
    parse from the container file a first checksum;
    select one or more of said at least two media data units on the basis of the scope information;
    derive a second checksum on the basis of the types of information on said one or more of said at least two media data units;
    compare the first checksum and the second checksum; and
    determine at least one of the following:
    when the first checksum is equal to the second checksum, determine that the metadata item is valid for said one or more of said at least two media data unit; or
    when the first checksum is not equal to the second checksum, determine that the metadata item is not valid for said one or more of said at least two media data units.

4. The apparatus according to claim 3, said at least one memory stored with code thereon, which when executed by said at least one processor, causes the apparatus to:
    remove the metadata item, the first checksum and the scope information from the file, when the first checksum is not equal to the second checksum.

5. A computer program product embodied on a non-transitory computer readable medium, comprising computer program code configured to, when executed on at least one processor, cause an apparatus or a system to:
    receive a container file according to a first format, the container file including or referring to at least two media data units;
    receive a metadata item according to a second format different from the first format, the metadata item being valid for one or more of said at least two media data units, the container file including or referring to the metadata item;
    parse from the container file scope information indicating said one or more of said at least two media data units, wherein the scope information additionally comprises types of information on said one or more of said at least two media data units;
    parse from the container file a first checksum;
    select one or more of said at least two media data units on the basis of the scope information;
    derive a second checksum on the basis of the types of information on said one or more of said at least two media data units;
    compare the first checksum and the second checksum; and
    determine at least one of the following:
    when the first checksum is equal to the second checksum, determining that the metadata item is valid for said one or more of said at least two media data units; or
    when the first checksum is not equal to the second checksum, determining that the metadata item is not valid for said one or more of said at least two media data units.

6. A method comprising:
    obtaining or generating a container file according to a first format, the container file including or referring to at least two media data units;
    including in the container file a checksum derived from information on said one or more of said at least two media data units;
    obtaining or generating a metadata item according to a second format different from the first format, wherein the metadata item is valid for one or more of said at least two media data units according to the checksum, the container file including or referring to the metadata item;
    including in the container file scope information indicating said one or more of said at least two media data units; and
    including in the container file scope information additionally indicating types of information on said one or more of said at least two media data units used for deriving the checksum.

7. The method according to claim 6, wherein the types of information comprise at least one of the following:
    size of each of said one or more of said at least two media data units;
    said one or more of said at least two media data units.

8. The method according to claim 6, wherein the scope information comprises a sample group for associating said one or more of said at least two media data units with the metadata item.

9. An apparatus comprising at least one processor and at least one memory, said at least one memory stored with code thereon, which when executed by said at least one processor, causes an apparatus to perform at least the following:

obtain or generate a container file according to a first format, the container file including or referring to at least two media data units;

include in the container file a checksum derived from information on said one or more of said at least two media data units;

obtain or generate a metadata item according to a second format different from the first format, wherein the metadata item is valid for one or more of said at least two media data units, the container file including or referring to the metadata item according to the checksum;

include in the container file scope information indicating said one or more of said at least two media data units; and include in the container file scope information additionally indicating types of information on said one or more of said at least two media data units used for deriving the checksum.

10. The apparatus according to claim 9, wherein the types of information comprise at least one of the following:

size of each of said one or more of said at least two media data units;

said one or more of said at least two media data units.

11. The apparatus according to claim 9, wherein the scope information comprises a sample group for associating said one or more of said at least two media data units with the metadata item.

12. A computer program product embodied on a non-transitory computer readable medium, comprising computer program code configured to, when executed on at least one processor, cause an apparatus or a system to:

obtain or generate a container file according to a first format, the container file including or referring to at least two media data units;

include in the container file a checksum derived from information on said one or more of said at least two media data units;

obtain or generate a metadata item according to a second format different from the first format, wherein the metadata item is valid for one or more of said at least two media data units according to the checksum, the container file including or referring to the metadata item;

include in the container file scope information indicating said one or more of said at least two media data units; and include in the container file scope information additionally indicating types of information on said one or more of said at least two media data units used for deriving the checksum.

\* \* \* \* \*

UNITED STATES PATENT AND TRADEMARK OFFICE
CERTIFICATE OF CORRECTION

PATENT NO. : 9,820,015 B2  
APPLICATION NO. : 14/583332  
DATED : November 14, 2017  
INVENTOR(S) : Malamal Vadakital et al.

Page 1 of 1

It is certified that error appears in the above-identified patent and that said Letters Patent is hereby corrected as shown below:

In the Claims

Column 33,
Line 63, "media data unit" should read --media data units--.

Signed and Sealed this
Nineteenth Day of June, 2018

Andrei Iancu
*Director of the United States Patent and Trademark Office*